Jan. 18, 1949.　　　　L. J. KOCI　　　　2,459,169
RADIATION THERMOSTAT CONTROL FOR TOASTERS
Filed Jan. 9, 1946　　　　3 Sheets-Sheet 2

Inventor:
Ludvik J. Koci
By
McCanna, Wintercorn & Morbach
Attys.

Patented Jan. 18, 1949

2,459,169

UNITED STATES PATENT OFFICE 2,459,169

RADIATION THERMOSTAT CONTROL FOR TOASTERS

Ludvik J. Koci, Chicago, Ill., assignor to Sunbeam Corporation, Chicago, Ill., a corporation of Illinois Application January 9, 1946, Serial No. 639,934

20 Claims. (Cl. 99—331)

The present invention relates to apparatus for toasting bread and more particularly to an improved apparatus for terminating a bread slice toasting interval precisely when the desired degree of toasting is obtained. This application is a continuation-in-part of applicant's co-pending application Serial No. 425,299, filed January 1, 1942, now abandoned.

Various arrangements have been proposed for use in electric toasters in attempts to so determine the toasting interval that uniform toasting of a plurality of bread slices during successive use intervals of a toaster is obtained. Generally speaking, determination of the toasting interval to provide for a uniform degree of toasting, regardless of the character of the bread and under any and all operating conditions of the toaster, is dependent upon a variety of different factors. Specifically, the type of bread, i. e., rye, whole wheat, raisin, or white, the bread slice size and the degree of dryness of the bread, all represent variable factors which influence the degree of toasting produced during a given toasting interval. Further, changes in the environment temperature, variations in the excitation voltage of the toaster heating elements and variations in the amount of heat generated by the heating elements as between an initial toasting operation and immediately succeeding toasting operations represent additional variable factors influencing the degree of toasting of a particular bread slice obtained during a given increment of toasting time. The usual commercial practice is that of resolving all of these factors on an entirely empirical basis and of employing clock or thermal timers having the function of measuring out an arbitrarily determined toasting interval and then de-energizing the toaster heating elements. Various elaborate refinements have been made in mechanisms of this type in attempts to prevent noticeable differences in the degree of toasting realized, particularly as between bread slices toasted during an initial and succeeding operations of a toaster. Such mechanisms are not only high in initial cost, but in addition, require costly servicing and fall far short of producing the desired end of obtaining uniform toasting regardless of the character and condition of the bread toasted and the operating conditions surrounding use of the toaster. The lack of uniformity of the degree of toasting is particularly noticeable when bread slices of the same type, but in different conditions of dryness, are toasted in a toaster equipped with a conventional type of timing mechanism.

Recognizing that to some extent at least, the degree of toasting of a bread slice may be measured in terms of the color imparted to the surface during the toasting operation, proposals have been made in the art for utilizing light responsive facilities exposed to light reflected from the bread surface to determine the toasting interval. This proposal has not met with commercial acceptance for a variety of different reasons. Thus, since the different types of bread, i. e., rye, whole wheat, raisin, and white, are essentially of different colors, the light reflecting characteristics of their surfaces obviously vary. Hence, different degrees of toasting are necessarily obtained when reflected light from the surfaces of different colors is relied upon to determine the toasting interval. Secondly and equally important, the intensity of environment light quite obviously determines the magnitude of light reflection from the surface of the bread being toasted. In the usual home, environment light conditions fluctuate widely with time and under different climatic conditions. A further difficulty with this proposal resides in the fact that the percentage change in the amount of light falling upon the light sensitive element as between reflection from toasted and untoasted bread slice surfaces is so small as to be either incapable of accurate detection or to require the use of very sensitive and hence bulky and expensive detecting apparatus. A further practical objection to the proposal is the large amount of auxiliary equipment, i. e. the photoelectric cell, vacuum tube amplifier and power pack, required to measure the reflected light.

It has been found that the most accurate index which may be relied upon in determining the degree of toasting of a bread surface is the temperature of the surface. In other words, regardless of the type, character or condition of the bread being toasted, the temperature of the bread surface in the course of the toasting operation bears a close relationship to the degree of toasting. This factor has been recognized by certain research workers in the art who have advanced the proposal of employing a temperature responsive element in contact with the bread surface being toasted to determine the toasting interval. Superficially, this proposal appears sound. From a practical standpoint, however, several severe obstacles are encountered. Thus the thermal element must of necessity be positioned in the path of heat radiation from the heating element of the toaster. Hence, it receives heat energy directly from the heating elements. This direct heat from the elements may be larger in effect than that conducted from the bread surface, especially where there is poor contact.

Further, the contacting thermal element shields a portion of the bread surface being toasted with the result that a shadow in the form of an untoasted area of the bread surface is present on the finished product. More important, the area which is shielded is the precise area at which the temperature measurement is made by the thermal element. Hence, heat conduction through the bread structure from the adjacent heated areas must be relied upon to effect response of the thermal element. Bread is a notoriously poor heat conductor, however, and the heat conductivity thereof varies widely depending upon the type, character and condition of the bread. The occasional presence of large holes in the bread surface at the point where the thermal element makes contact is a further factor in making for non-uniformity in funtcion. Also, the response is, at best, to that of a very small area of the bread surface, actually to an untoasted area. It is thus apparent, therefore, that the contact type of bread surface temperature measuring device is undesirable. To summarize, no practical device has heretofore been proposed or developed which takes into account all of the variable factors involved in toasting bread and yet so determines the toasting interval that a uniform degree of toasting is obtained under any and all circumstances.

It is an object of the present invention, therefore, to provide an improved automatic toaster which may be used to produce a uniform degree of toasting under any and all operating conditions of the toaster and regardless of the type, character or condition of the bread to be toasted.

It is another object of the invention to provide a toaster in which control of the toasting interval is effected in response to radiant energy emission from the heated surface of a bread slice.

According to still another object of the invention, determination of the bread surface toasting interval is effected primarily in response to infra-red energy emission from the heated surface of a bread slice.

It is a further object of the invention to provide a toaster in which control of the toasting interval is effected in response to the average surface temperature of a large area of the bread surface.

A still further object of the invention is the provision of a toaster having thermostatic means remote from the bread surface so as not to interfere with the toasting of any portion of the bread surface, for receiving radiant energy emitted from the bread surface to control on a bread surface temperature basis the duration of the toasting interval.

In accordance with still another object of the invention, facilities are provided for preventing the response of the thermostatic control means from being appreciably affected by environment energy other than the radiant energy emitted from the heated surface of the bread.

It is also aimed to provide an automatic toaster capable of toasting slices of different kinds of bread such as white, rye, whole wheat, raisin, and the like, to a substantially uniform degree at the option of the user without change in the adjustments of the toaster.

It is another object of the invention to provide in a toaster, novel control of the heat applying means which embodies a new principle of operation whereby greater accuracy and dependability are obtained through the use of a thermostat which responds to radiant energy emitted by virtue of the temperature of the bread surface being toasted.

In accordance with still another object of the invention, each bread slice is heated to the same surface temperature regardless of the point in the operating cycle of the heater control means at which it is positioned upon the bread slice holding means.

According to a still further object of the invention, subsurface toasting to producing so-called "Melba" toast is obtained by permitting a bread slice to remain in the toaster while the heater control means automatically operates through a measured plurality of cycles during each of which the bread slice surfaces are heated to the same predetermined temperature.

Other objects and advantages will become apparent to those skilled in the art from the following description and the accompanying drawings, in which.

The present invention contemplates a toaster wherein the toasting interval is terminated or indicated in response to radiant energy emission from the heated surface of the bread slice being toasted when the surface of the slice reaches a predetermined temperature. While the invention may be embodied in any conventional type of toaster, it is preferred to employ, and certain additional advantages result from, using a toaster of the reflector type, one suitable example being shown and claimed specifically in the co-pending application of Ivar Jepson, Serial No. 389,916, filed April 23, 1941, now Patent No. 2,368,026. As there disclosed, the bread slice is toasted by means of radiant heat distributed thereover by means of heating coils and reflectors, the reflectors serving to give the required distribution of radiant heat over opposite sides of the bread slice. In the illustrated embodiment of the present invention, ply metal thermostatic means are located in spaced relation to the bread slice so as to be responsive to the average radiant energy emission from the heated surface, the thermostatic means being arranged to actuate a suitable mechanism having the function of terminating the toasting interval.

The invention is predicated upon certain findings which have been made, including the fact that the bread surface will always emit a definite amount of radiant energy, primarily within the infra-red region of the frequency spectrum, per unit area of bread surface when brought to a pre-selected temperature, coupled with the fact that during the toasting operation this temperature will always correspond to a certain brownness on the surface of the bread. For example, it appears that with bread of normal composition, practically no visible chemical change occurs in a slice subjected to temperatures below about 300° F. However, as the temperature approaches about 400° F., chemical changes occur at an exponentially increasing rate. Time and the rate of heat input are other factors also involved in the consideration of the degree of chemical change produced. However, the temperature factor has been found to be so critical as to make the other two factors of negligible importance insofar as obtaining uniformity of toasting is concerned. Thus, according to my invention, when the bread surface during a toasting operation reaches a predetermined degree of toasting, the radiant energy emission therefrom by virtue of the bread surface temperature will always be substantially the same, and this emitted energy may be used for the purpose of actuating the required control mechanism.

Figure 3:
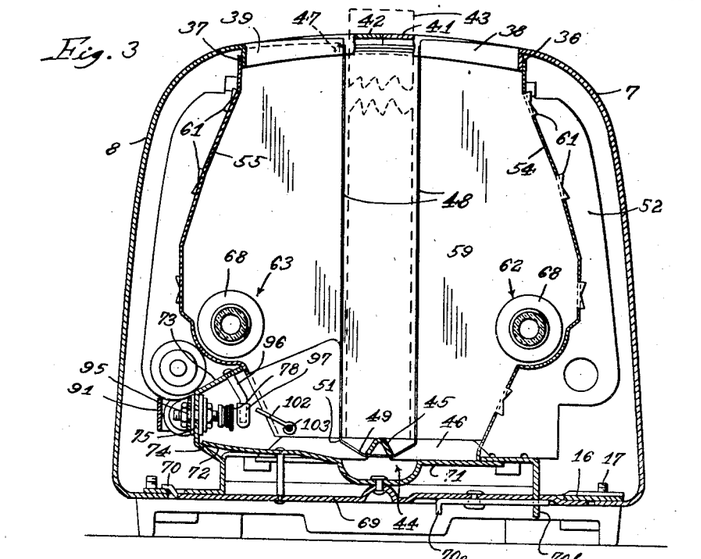
Fig. 3 is a transverse vertical section taken substantially on the line 3—3 of Figure 1.

Referring now to the drawings and more particularly to Figures 1, 2, 3 and 4 thereof, the present invention is there illustrated in its embodiment in a toaster which includes an outer casing having side members 7 and 8 (Figures 3 and 4) curved transversely of their length as best shown in Figure 3. The ends of the side members 7 and 8 have inwardly disposed edges as shown at 9 for reception within inwardly curved edges 11 on the sides of end members 12 and 13, the side members being spaced at the top by depending flanges 14 and 15 receivable within the top opening between the side members, as will presently become apparent, and as shown and described in the above-identified Jepson patent. The lower edges of the side members 7 and 8 fold under a bottom plate indicated generally by the numeral 16 and are secured thereto by screws 17 spaced along the side members. Likewise, the end members 12 and 13 pass under the plate 16 as indicated at 18 and are secured thereto by screws as indicated at 19. The plate 16 is supported at opposite ends on blocks 21 and 22 of insulation material, such as Bakelite or the like, and in this instance is secured thereto by upstanding bosses 23 on the end members through which screws 24 pass into the bottom of the plate (note Figure 1). Each of the blocks has depending portions as shown at 25 and 26 forming legs for supporting the base plate in spaced relation to the surface of an object upon which the toaster is placed.

Figure 1:
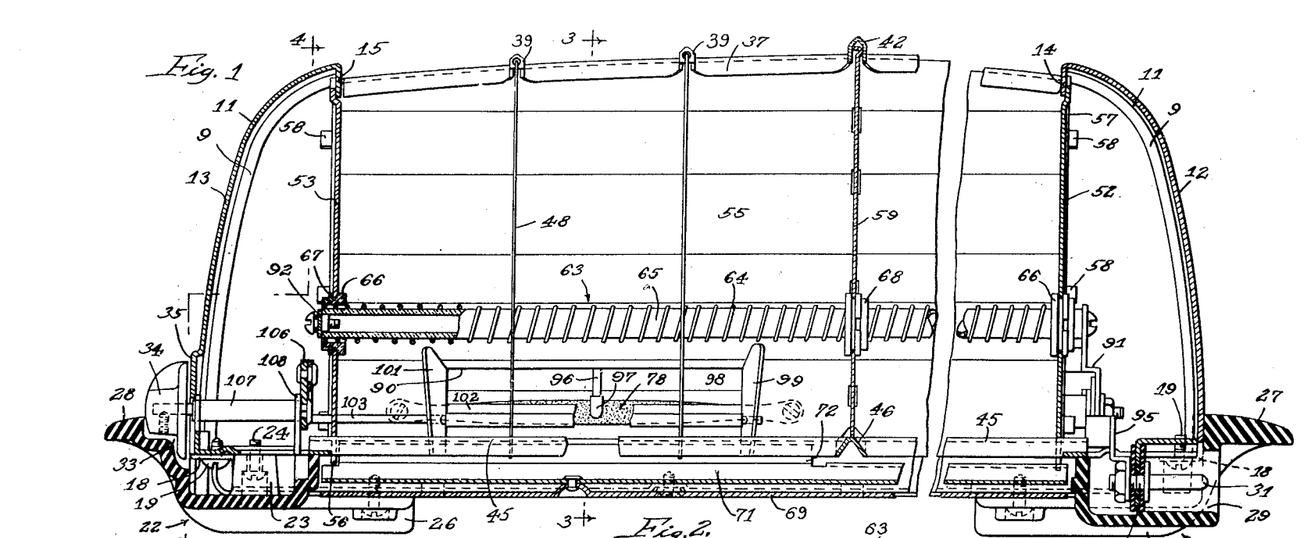
Figure 1 is a vertical section taken longitudinally through a toaster embodying my invention.
Figure 2:
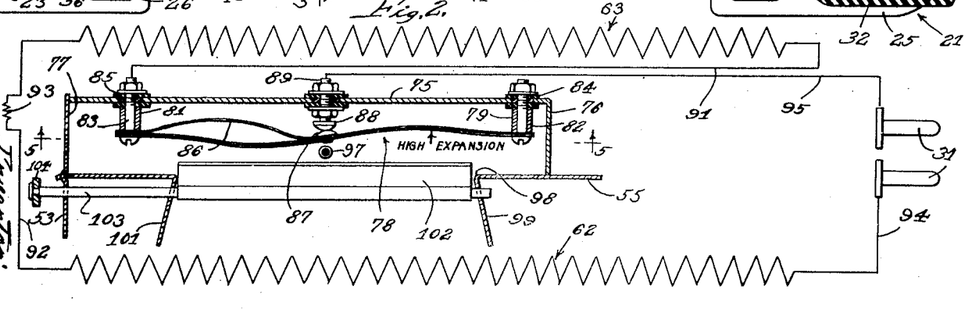
Fig. 2 is a fragmentary section through the thermostat enclosure showing a wiring diagram.

The blocks also have laterally disposed handles 27 and 28 which serve for the manual movement of the toaster from place to place. Disposed below the handle 27 is a socket or opening 29 within which the usual attachment prongs 31 are supported, the prongs being carried on a depending lip 32 struck from the base plate and bent downwardly across the opening 31, as best shown in Figure 1, and being suitably insulated in their attachment thereto. The handle 28 is recessed as shown at 33 for the reception of an adjusting knob 34 which serves to adjust the control mechanism and cooperates with a scale carried on the surrounding portions of the end member 13, as indicated at 35, for the purpose of indicating the degree of toasting, or color, for which the control mechanism is set.

In the illustrated embodiment of the invention, two toasting chambers or compartments have been provided, each for toasting a single slice of bread. In the respective chambers there are provided identical toasting means and since the bread slices are usually from a common loaf of uniform characteristics, only a single control mechanism actuated by radiation from the toasted slice in one of the chambers has been provided for controlling the toasting interval for both slices. The chambers may be arranged in any suitable or desired relative position and to provide each with an open top for loading and unloading, the chambers are herein shown in end-to-end relation. Each toasting chamber is of such size that an average slice of bread from an average loaf sold for home consumption may be supported in a vertical toasting position centrally in the chamber with the top portion of the slice projecting through and beyond the open top of the chamber. The user may, therefore, conveniently take hold of the projecting portion of the slice to remove it. This structure, as pointed out in the above mentioned Jepson patent, provides for manual loading and unloading and eliminates movable bread carriers or supports with their attendant complicated operating mechanisms. My invention may, however, be embodied in other types of toasters.

In the illustrated structure, the side edges of the top opening are defined by depending flanges 36 and 37 formed from the outer members of the casing. These members are further formed to provide inwardly projecting narrow fingers 38 and 39 which serve to anchor the upper ends of vertical bread guides in the form of relatively small diameter stainless steel wires 48. It will be seen that these fingers extend to points adjacent to the center of the toaster and are arranged in such spaced relation that a slice of bread can be disposed therebetween as indicated at 43. With this structure and because of the open space between the fingers and the relatively wide opening at the top of the toasting chamber, the slice is continuously visible throughout substantially its entire width through the open top of the casing. In the illustrated structure, the toaster is provided with a stationary slice support designated generally by the numeral 44 extending longitudinally thereof, the support being formed from the same metal as the plate 16 and comprising a central portion 45 and a transverse stiffening rib 46 disposed midway between the ends of the toaster to co-operate with the transverse partition presently to be described. The bread slices are supported laterally and maintained in substantially vertical position by the wires 48 which extend between the fingers 38 and 39 and the support 45. Each of these wires is provided with hooked ends 47 engaged in openings in the ends of the fingers 38 and 39, a vertically disposed portion which constitutes a bread guide, and a bottom portion 49 seated in slots in the lower side of the support 45, each wire being bent as shown at 51 to bring the vertical portions into substantial parallelism. These wires are tensioned slightly so as to normally exert a pull downward on the ends of the fingers, and in this manner the fingers serve to maintain the wires taut under different conditions of expansion of the wires experienced during operation of the toaster.

Figure 4:
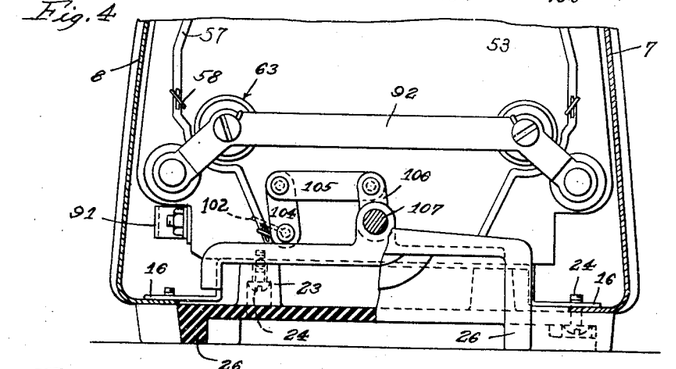
Fig. 4 is a transverse vertical section through the end of the toaster and taken substantially along the line 4—4 of Figure 1.

The toaster also includes an inner casing comprised of end walls 52 and 53 spaced from the end members 12 and 13 and reflectors 54 and 55 disposed in spaced relation to the sides 7 and 8 of the outer casing, as will best be seen from Figure 3. The end walls 52 and 53 seat at their bottom edges against the plate 16 and have fingers 57 projecting through the plate and twisted slightly to retain the walls in position. The upper ends of the wall are retained in position by the depending flanges 14 and 15 of the end members. The end members each have ribs, such as shown at 57, impressed therein for the location and reception of the ends of the reflectors 54 and 55. Specifically, the ribs have openings for the passage of tabs as shown at 58 formed on the ends of the reflectors, and the tabs are twisted slightly as shown in Figure 4 to secure the end members and the reflectors in assembled relationship. The interior of the toaster is divided into two compartments or chambers by means of a partition or supporting wall 59, likewise provided with tabs as shown at 61 projecting through openings in the reflectors, the tabs being twisted to secure the partition in assembled relationship. The upper edge of the partition 59 is held within narrow fingers 41 and 42 similar to the fingers 38 and 39 but extended into abutting relation, as shown in Figures 1 and 3, while the lower edge of the partition seats against the upper side of the stiffening rib 46.

Disposed in front of the reflectors are heating coils indicated generally by the numerals 62 and 63 (note Figure 3). Each of these coils is in the form of a wire helix 64 wound on a support 65 of insulation material such, for example, as a porcelain or ceramic tube. The ends of each tube pass through insulators 66 at opposite ends thereof and are secured in the walls 52 and 53 by means of snap rings 67. The heating coils also pass through similar insulators 68 disposed in the partition 59. The coils 62 and 63 serve in conjunction with their respective reflectors to supply radiant heat to opposite sides of the bread slices disposed as indicated at 43, and thus simultaneously toast both sides of both slices. As indicated above, the parts are so designed that a bread slice from an average size loaf will project from the toaster at its upper edge in the manner indicated in Figure 3 so that the bread slices may be inserted and removed by handling the bread directly and without the necessity of supplementary means for inserting and removing the slice, as required in many prior art constructions. The reflectors are so constructed that in this position of the bread slice, substantially uniform toasting will be produced throughout the area of the side surfaces thereof. Positioned against the lower side of the toaster is a bottom comprising a closure member 59 removably secured against the bottom plate by means of lugs 70 disposed along one edge of the bottom and adapted for reception in slots in the plate 16, and a sliding latch member 70a (Figure 3) disposed on the bottom of the closure member 69 and arranged for reception in an opening in a depending arm 70b. Carried on the top of the bottom member is a crumb tray 71, the crumb tray spanning the space between the lower edges of the reflectors 54 and 55 and having a laterally projecting portion 72 extending into the bottom of the thermostat enclosure presently to be described. The crumb tray and enclosure member are thus rendered easily removable so that crumbs may be removed from the bottom of the toaster and the usual cleaning operations performed thereon.

In accordance with the present invention, the degree of toasting, or in other words, the color of the toast, is controlled in response to radiant energy emission from the surface of the bread slice, whereas the condition of the slice as regards moisture content, or depth of toasting, is controlled by the length of time the operator permits the slice to remain in the toaster after the first toasting cycle is completed, as described hereinafter. Thermostatic means are provided for controlling the degree of toasting or the color of the toasted surfaces. Specifically, a thermostat enclosure is secured to the back of the reflector 55 below the heating element 63. This enclosure includes an upper wall 73, a lower wall 74, a back wall 75, and end walls 76 and 77, the side and end walls being secured at their forward edges against the back of the reflector 55 in such manner that the interior of the enclosure is substantially shielded against heat radiation directly from the heating element 63. A ply metal thermostat designated generally by the numeral 78 is positioned within the enclosure. This thermostat is in the form of a strip of thermostatic bimetal and is fixedly supported at its ends on metal sleeves 79 and 81 by means of bolts 82 and 83 which also act to secure the sleeves against the back wall 75 of the enclosure, the sleeves and bolts being electrically insulated from the enclosure by insulators 84 and 85. The high expansion side of the bimetallic strip is disposed to face the bread slice because in the described structure it is desired that the strip shall move toward the bread slice upon increase in temperature of the bread slice in order to effect de-energization of the heating elements in the manner described below. Also carried on the bolt 83 and disposed between the end of the thermostat and the sleeve 81 is a strip 86 of thin highly conductive metal, such as silver, which connects to a contact 87 riveted to the strip at substantially the mid-point thereof. This movable contact is arranged to coact with a second contact 88 mounted upon the end of a screw 89 which is carried on and adjustable in position with respect to the back wall 75 by means of nuts and insulators. The silver strip 86 is of such flexibility as to offer substantially no resistance to movement of the thermostat and serves electrically to connect the contact 87 through the bolt 83 and a suitable conductor such as a bus bar 91 (Figures 2 and 3) with the heating coil 63. This coil is in turn connected to the heating coil 62 through a bus bar 92 and a lamp 93 or other signal device serially included in the circuit to indicate the condition thereof. The coil 62 is connected to one of the terminal posts 31 by a bus bar 94. A bus bar 95 connects the other terminal post 31 to the screw 89 to complete the circuit to the contact 88. It will thus be seen that when the contacts 87 and 88 are closed, the heating coils 62 and 63, together with the signal device 93, are energized, and when these contacts are open, the described circuit elements are de-energized. The contact 88 limits the movement of the bimetallic strip in one direction, namely, in the direction in which the strip moves upon cooling, and stop means are provided for limiting the movement of the strip in the opposite direction to open the contacts. The stop means comprises a pin 96 (Figure 3) having a porcelain or other insulating tip 97 on the end thereof, the pin being positioned in the upper wall of the enclosure and the porcelain tip projecting into the path of the strip to limit the movement of the strip in the direction in which it moves when the middle portion is heated. The position of this stop determines the bread surface temperature at which the thermostat will return to the "On" position (other conditions being equal). The stop should be so set that the thermostat returns to its "On" position at a sufficiently low temperature that the frequency of "On-Off" operation is not excessive and yet at a high enough temperature to avoid too great a delay when an untoasted slice of bread is inserted into the toaster. The exact location is largely a matter of experiment with each particular design, but under the conditions prevailing in the construction herein disclosed it has been found a thermostatic movement in the region of $\frac{1}{32}$" is satisfactory.

As will be seen from Figures 1 and 3, the reflector 55 has an opening 98 which is of lesser length than the length of the strip so that only the mid-portion of the strip is exposed to the radiant heat from the bread slice while the extreme ends of the strip and the mountings therefor are not so exposed. Positioned at the ends of the opening 98 are deflectors 99 and 101 which diverge inwardly toward the surface of the bread slice to prevent radiation from the ends of the toaster and radiant energy emitted from the heating element 62 past the ends of the bread slice from entering the enclosure and influencing the strip response during a toasting interval.

Adjustment of the thermostat mechanism to produce toast of different color, or in other words, adjustment of the degree of toasting, can be accomplished in a number of ways, as by changing the stress on the strip, by varying the position of the fixed contact point 88, or by varying the amount of radiant heat intercepted by the strip. The first two methods of adjustment serve to alter the degree of toasting by changing the temperature which the middle portion of the strip must attain before it snaps to its "Off" position. In the third method of adjustment, the thermostat is permitted to snap to its "Off" position always when the middle portion of the strip reaches a predetermined temperature relative to the end portions of the strip, but the rate at which heat radiated from the bread surface is absorbed by such middle portion is altered by adjustment of a baffle or the equivalent intended to intercept more or less of the radiant heat. In all of these adjustments, the temperature of the middle portion of the thermostat strip is referred to. It is to be understood that whenever the temperature of said strip mid-portion is mentioned, it is assumed that the temperatures of the end or compensating portions of the thermostatic strip remain unchanged, since it will be apparent that as the temperatures of the strip end portions change in response to change in temperature of the thermostat housing, the compensating action of the strip end portions will alter the temperature which the middle portion of the thermostatic strip must attain before snapping to its "Off" position, even though no adjustments of the type mentioned above are made in the device. In the illustrated structure, an adjustable baffle plate 102 is positioned in front of the opening 98, as will best appear from Figures 2 and 3, the baffle being supported on a rod 103 rotatably disposed in openings in the deflectors 99 and 101. The angular position of the baffle is adjusted through rotation of the rod 103 which projects through the end wall 53 and has at its end a link 104 connected by means of a second link 105 to a link 106 fixed to a shaft 107 carried on an upstanding ear 108 forming part of the base plate, the shaft 107 extending through the end member 13 and having the knob 34 disposed thereon. Thus, through rotation of the knob 34, the baffle can be rotated between various angular positions to shield the thermostatic strip as desired. This adjustment will predetermine the amount of radiation from the bread slice onto the strip, so that the bread slice will need to be heated to different temperatures dependent upon the position of the baffle in order to emit sufficient radiant energy to cause the strip to move from the contact closed position to the contact open position and thereby de-energize the heating coils 62 and 63. However, other means of adjustment may be employed as mentioned above.

Figure 5:
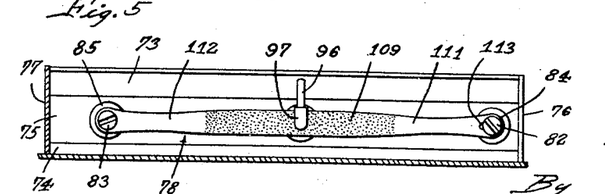
Fig. 5 is a face view of the thermostat and enclosure taken along the line 5—5 of Fig. 2.

The thermostat strip 78 is of novel form and is so constructed and mounted that compensation or correction for temperature changes of the enclosure and surrounding elements is produced within the body of the strip, the thermostat herein shown being one species of the generic invention described and claimed in Patent No. 2,332,518, granted October 26, 1943, and entitled Thermostat. Specifically, the bimetallic strip is mounted at its ends so that the end portions are held against angular motion in response to change in temperature. In order to obtain an essentially lagless response of the main portion of the thermostat to the surface temperature of the bread slice, as contemplated by this invention, the thermostat must be of minimum mass commensurate with the other factors involved, such as obtaining necessary freedom from effects of external vibration and obtaining adequate thermostatic power for control of current. In the illustrated embodiment the thermostat is in the form of a narrow and thin bimetallic strip having a thickness in the region of .008" and a width substantially that shown in the drawings. The composition of the strip is determined by the usual factors, and in the present case there is employed what is commercially known as "high heat" thermostatic material. As heretofore pointed out, the end portions of the strip are firmly held against supporting sleeves 79 and 81 by the screws 82 and 83 to prevent angular motion of said end portions in response to temperature changes. Moreover, and as will be noted from Figure 5, the strip is wider at the center and tapers toward the ends so that the end portions 111 and 112 are of somewhat lesser width than the center. These shape characteristics, together with the described mounting arrangement, cause the strip to exhibit not only a primary thermostatic action responsive to the temperature of the bread slice, but in addition, a secondary compensating thermostatic action responsive to the temperature of the enclosure and surrounding elements. The arrangement should be such as to produce maximum response of the central portion of the strip to the average temperature of the surface of the slice of bread being toasted, and minimum response of this strip portion to the temperature of other objects surrounding the thermostat, such as the toasting element and the enclosure. With this object in view the opening 98 and the enclosure are so arranged that the enclosure will shield the strip from undesired radiation and from excessive and unreliable thermo-convection currents. The inside of the enclosure is provided with a bright surface which acts as a reflector of such shape as to receive radiation from a large area of the bread slice and direct all such radiation onto said thermostat, and also acts to re-direct undesirable radiation away from the thermostat. Likewise, and as will be apparent from Figures 2 and 5, the opening 98 is of lesser length than the length of the thermostat so that the end portions of the thermostat are shielded from direct radiation from the surface of the bread. Thus, these end portions are primarily responsive to the temperature of the enclosure and surrounding elements. The degree of thermal responsiveness of the central portion of the strip to radiant energy emission from the bread slice is further enhanced by treating the central portion of the strip, front and back, so that these surfaces have a high absorption coefficient for infrared rays. This may be accomplished by coating the central portion with a black coating (lamp black or the like) as indicated at 109 (Figure 5) or by otherwise treating the surface of the strip to increase the coefficient of absorption for radiant energy emission from the bread slice. The coated portion of the strip is essentially that in which the primary response is obtained in response to radiant energy emission from the bread slice. The strip end portions 111 and 112 are provided with polished and highly reflective surfaces and hence have a minimum coefficient of absorption for the radiant infra-red energy. Accordingly, they are largely responsive to changes in temperature of the enclosure and adjacent parts and thus contribute to the thermostat movement a compensating effect for environment changes in the temperature thereof. Specifically, these strip portions set up a thermostatic action which is opposite to that of the coated portion, as disclosed in the above-mentioned Patent No. 2,332,518. Accordingly, a rise in temperature at the bright end portions will cause an increase in forces tending to produce motion in a direction opposite to that caused by a rise in temperature of the central portion.

The ratio between the width of the end portions and the width of the central portion of the thermostat depends upon the thermal coupling coefficient between the thermostat, the bread surface, and the surroundings adjacent to the thermostat. By thermal coupling coefficient, the relative degree of thermal responsiveness between the elements involved is referred to. For example, by high coupling coefficient between the central portion of the strip and the bread slice, a high degree of responsiveness of the central portion of the thermostat to changes in radiant energy emission from the bread surface surface is implied. If a high coupling coefficient with respect to the bread surface and a low coupling coefficient with respect to the enclosure surrounding the thermostat exist, a strip structure is required in which the end portions are narrow as compared with the central portion of the strip for the reason that only a small degree of compensation is required. Such a condition only prevails under circumstances in which practically all of the heat delivered to the mid-portion of the strip is by radiation from the bread slice and and a very small amount is transferred from surrounding objects. From a practical standpoint, however, there is substantial response of the mid-portion of the thermostat to temperature of the surrounding objects, and it is therefore necessary that the strip end portions 111 and 112 be of such width as to exert an appreciable compensating effect on the net movement of the strip. The exact width depends, of course, upon the thermal characteristics of each particular design, but it is advisable and desirable to design the combination so as to obtain a minimum practical thermal coupling between the central portion of the strip and its immediate surroundings so as to require a minimum degree of compensation.

If the longitudinal stress on the strip and the amount of thermostatic movement of the central portion is held below a certain point, the strip will move with a slow and progressive movement, whereas if the longitudinal stress is increased, the strip will move between its two stop positions with a snap action. While the slow acting movement may be employed, it is preferred to stress the strip longitudinally to a degree sufficient to move with a snap action, thereby to effect rapid make-and-break of the contacts and to produce a relatively wide range between the contact making temperature and the contact breaking temperature. It has been found that the strip may be suitably stressed by tightening the screw at one end and then deflecting the center portion of the strip to the extent of about $\frac{3}{16}$ of an inch and then tightening the screw at the opposite end, the end of the strip being slotted as indicated at 113 to permit the described deflection of the central portion. It will be understood, however, that the degree of this deflection depends upon the snap characteristics desired in the completed structure and the temperature range through which it is desired to have the thermostat operate. The use of a reflector type toasting element in the combination permits use of a relatively large opening to the thermostat enclosure, thus enabling a large amount of radiant energy from the bread surface to ultimately reach the thermostat surface. This, in turn, results in operation of the thermostat with more snap action energy, and consequently assures more dependable operation. It is not alone sufficient that the opening in the thermostat enclosure be as large as practicable, but the inside surface of the enclosure should be of reflective character and suitably formed and located relative to the thermostat to insure that practically all of the desirable (bread slice) radiation finally reaches the blackened thermostat surface either directly or by reflection from the inside walls of the enclosure. In other words, by employing a construction in which the single heating element 63 functions to distribute the heat over one entire side surface of the bread, the opening 98 can be relatively large, thus gathering into the thermostat a relatively large amount of radiant energy from the bread surface without subjecting the thermostat to radiation from the heating element and without interfering with the heating of the bread slice surface in such manner as to produce shadow effects on the finished toast. As indicated above, since the thermostatic strip is compensated, a pre-selected point on the center portion of the strip does not always snap at the same temperature, for the reason that the end portions 111 and 112 exert compensating forces on the central portion thereof to compensate for changes in the temperature of the enclosure. For this reason the strip center portion will move at pre-selected temperatures of the bread surface but at variable thermostat temperatures due to changes in the temperature of the enclosure. However, other thermostatic materials may be used, such, for example, as any device responsive to thermal radiation which has contained within itself the property of properly compensating for the temperature of the enclosure.

Directing attention now more particularly to the mode of operation of the thermostatic strip, and assuming that the high expansion side of the strip faces toward the bread slice, it will be seen that if the ends of the central portion of the strip were supported for free pivotal movement, the central portion of the strip would move toward the bread slice at a predetermined temperature when the central portion was uniformly heated. On the other hand, if only the strip end portions 111 and 112 were heated to a uniform degree, they would tend to warp upon increase in temperature in a direction such that the portions thereof adjacent the central portion would move away from the bread slice due to the fact that the extreme ends of the strip are prevented from angular thermostatic warpage. Since the central portion and the end portions constitute a single piece of bimetal, these two forces are superimposed upon each other and consequently as the end portions become more highly heated, the central portion must assume a higher temperature before it can snap to the position toward the bread slice representing the open contact position. In this way the thermostat strip has within itself and its mounting the means for producing the required composite thermostatic action. It will of course be understood that no precise line of demarcation can be drawn between the central portion and the end portions, and that this is doubtless an area as distinguished from any particular line. In other words, the two forces are simultaneously produced in the strip, and exert their effect throughout the length of the strip progressively varying in degree from end to end thereof, as particularly described in connection with Figures 5 to 8 of the above identified patent.

Figure 6:
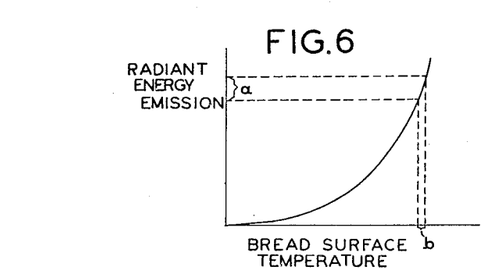
Figs. 6 and 7 are graphs illustrating certain operating characteristics of the present improved toaster.

In operation, the terminal posts 31 are connected to a suitable source of electrical energy. In case the toaster is cold when such connection is made the heating elements will be immediately energized even before the slice is inserted into the toaster because of the fact that the thermostat is originally in its "On" position. In the illustrated embodiment the thermostat is normally in the "On" position when cold because of its design characteristics, whereby the strip will automatically snap to this position at any time when any surface in its angle of view is at a temperature lower than a predetermined high temperature depending on the position of the adjustment setting, as previously explained. A slice of bread such as that shown at 43 is dropped into the toaster in the position indicated in Figure 3. As the temperature of the bread surface increases, due to the heat energy radiated thereto from the heating element 63 and the reflector 55, the radiant energy emission therefrom per unit area thereof increases exponentially generally in accordance with the curve illustrated in Figure 6. Specifically, the radiant energy emission from the heated bread surface follows a fourth power law as the surface temperature of the bread slice increases. As previously pointed out, this energy is concentrated or focused upon the center portion 109 of the thermostatic strip 78 to produce a resultant increase in the temperature of this strip portion. When the strip midportion 109 attains a predetermined temperature, corresponding to a predetermined bread surface temperature determined by the setting of the knob 34, the thermostat will snap to the "Off" position, terminating the initial toasting interval. Where signal means, such as the lamp 93 are employed, the lamp will be simultaneously de-energized to indicate the termination of the toasting interval. It will be observed that the top of the toaster is open to such a degree that practically the entire surface of the bread slice is visible to the user during the toasting interval, and consequently the user may remove the slice when it acquires the desired color should the knob 34 be set for a color darker than that desired.

From the above explanation it will be understood that during the toasting interval, the temperature of the thermostatic strip mid-portion 109 increases at a much faster rate than the temperature of the bread surface, due to the described exponential relationship between the bread surface temperature and the radiant energy emission therefrom. Thus, and again referring to Figure 6, the radiant energy emission represented along the vertical axis of the graph is roughly proportional to the temperature of the strip mid-portion 109, neglecting environment conditions and specifically heat conduction away from the strip mid-portion. This means that for a given bread surface temperature change as represented by the range "b" we obtain a proportionately greater change in radiant energy emission as represented by the range "a" and a similarly larger change of temperature of the thermostat mid-portion than would occur if this relationship were linear. Specifically, a very small bread surface temperature range, embracing the temperature required to effect the desired degree of toasting, corresponds to a relatively broad temperature range of the strip mid-portion 109, with the result that relatively large variations in the operating response of the thermostatic strip as between successive operating cycles are permissible without appreciable variation in the degree of toasting obtained. This is in contrast with the contact type of bread surface temperature measuring device referred to in the introductory portion hereof, wherein the temperature of the thermostatic element tends to follow the bread surface temperature, with the result that variations in the response of the thermostatic element produce like variations in the degree of toasting.

Premature removal of a bread slice from the holding means of the toaster will in no way affect the degree of toasting of the subsequent slices. Upon such premature removal of the slice, radiant energy from the heating element 62 impinges directly on the strip and causes the strip to move promptly to the "Off" position, thereby to de-energize the heating elements. The structure is such that if the user desires to produce so-called Melba toast, the slice 43 is simply left in position upon the opening of the contacts and the termination of the initial toasting interval. The surface of the bread slice then begins to cool, and as it cools, the radiant energy emission from the surface of the slice decreases, permitting the strip mid-portion 109 to cool also. When this strip part is cooled to a temperature below that required to maintain the strip in the contact open position, the strip snaps back to its closed position to re-energize the heating elements. Heat is thereupon reapplied to the surfaces of the bread slice until the surface again reaches the toasting temperature, whereupon the contacts are again opened due to radiation from the surface of the slice. This cycle is repeated until the operator removes the slice and the repeated cycles serve to dry out the interior of the slice and produce Melba toast without darkening the exterior surface to any appreciable extent, for the reason that, as previously pointed out, the color of the toast is primarily a function of the temperature to which it is heated. The successive "On" periods cause the toasting action to penetrate to greater depths and thus ultimately to produce what is known as Melba toast.

In further explanation of the operation of the radiant energy responsive control means (in the illustrated embodiment where the heating elements at both sides of the bread slice are controlled) it will be observed that when the heating elements have been energized by connection to the current supply and before inserting a bread slice, the element 62 opposite the thermostat and within the angle of view thereof will rise in temperature. The resulting increase in radiant energy emission from this element due to its temperature rise will cause the thermostat 78 to snap to the "Off" position within a few seconds after the element 62 is energized. If the toaster is still left connected without insertion of a bread slice, this element will begin to drop in temperature by loss of heat to the surroundings and when this temperature drops to the extent that radiant energy emission therefrom drops to a predetermined low value, the thermostat will then snap back to its "On" position. The cyclic "On" and "Off" operation will occur at a much more rapid rate and with shorter ratio of "On" period to "Off" period than that which occurs when a bread slice is in the toasting position. However, in this case the "On" period is considerably shorter than the "Off" period and the average input to the toaster is substantially less than the available input so that there is no great waste of energy or excessive temperature rise of the toaster if the toaster should be connected and operated in this manner for some length of time.

If in the course of such cyclic operation a bread slice is inserted for toasting, the resultant toasted slice will be of substantially the desired degree of toasting irrespective of the point in the above cycle at which the fresh bread slice may be inserted. Thus, if a slice is inserted at a point just an instant previous to that at which the thermostat snaps to its "Off" position the resultant toast is toasted to substantially the same degree as in the case where the bread slice is inserted at the instant when the thermostat has just snapped to its "On" position. This is because of the essentially lagless characteristic of the thermostat. Because of this, in the case where the bread slice is inserted an instant prior to that when the thermostat is about to snap to its "Off" position, the cool surface of the fresh bread slice immediately absorbs radiant energy emitted from the hot, blackened, medial portion of the thermostat, and the latter in consequence of its small mass or heat storage capacity quickly cools to essentially the same temperature it would have had in case a bread slice had been inserted when the mid-portion of the thermostat had been cooled and ready to snap to its "On" position because it was cool.

Figure 7:
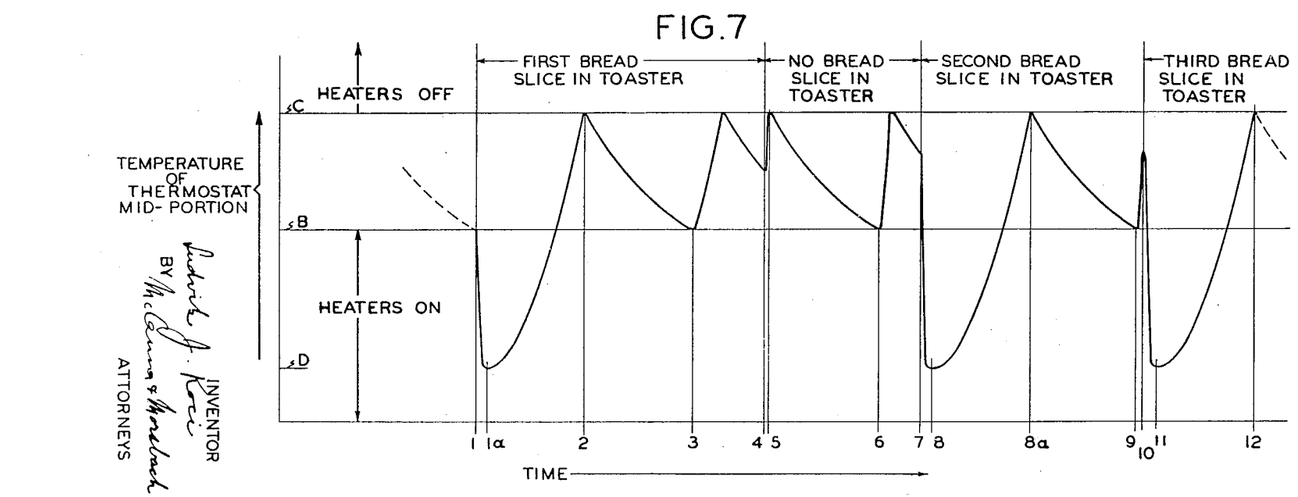

The described cyclic operation of the toaster is well illustrated in Figure 7 of the drawings (assuming that the temperature of the enclosing structure or the end portions of the thermostatic strip remains unchanged) wherein the vertical ordinates represent the temperature of the thermostatic strip mid-portion, the horizontal axis represents time, the saw tooth curve a represents variations in the temperatures of the thermostatic strip mid-portion 109 and the values B and C along the vertical temperature axis of the graph respectively represent relative temperature values corresponding to the heaters "On" and heaters "Off" settings of the thermostatic element. As there shown, if after the toaster has been in operation for a time, a first bread slice of selected type and condition is inserted in the holding means of the toaster at a point I along the time axis at which the temperature of the strip mid-portion 109 is exactly at the value B, the strip mid-portion starts to cool due to the fact that the surface of the slice facing the strip is at a temperature much lower than the temperature of the strip mid-portion. Accordingly, radiant energy is emitted from the strip mid-portion to the bread slice where it is absorbed, with the result that the strip mid-portion is rapidly cooled. When it has cooled to the value D, well below the heaters "On" temperature B during the interval 1—1a, the bread surface temperature starts to exceeed the strip mid-portion temperature so that the direction of radiant energy transfer is reversed to produce an increase in the temperature of the strip mid-portion. Specifically, the radiant energy emission from the toasted surface of the bread slice causes an exponential rise in the temperature of the strip mid-portion (assuming a linear rise in bread surface temperature during this interval), finally resulting in movement of the strip to its heaters "Off" position when the strip mid-portion attains the temperature C. During the ensuing cooling interval extending from the point 2 to the point 3 along the time axis, the temperature of the strip mid-portion 109 falls at an exponential rate. When the temperature of the strip mid-portion 109 again falls to the heaters "On" value B, a second operating cycle is initiated which is a repetition of the first cycle and persists for the interval 3—4 along the time axis.

Assume now that at the instant 4 along the time axis, corresponding to about three-quarter completion of the second operating cycle of the toaster, the first bread slice is removed from the holding means of the toaster. When this slice is removed from its shielding position between the heating element 62 and the thermostatic element 78, radiant energy is emitted directly from the identified heating element and concentrated or focused upon the strip mid-portion 109. As a result, and during the short time interval 4—5, the temperature of this strip portion rapidly rises at an exponential rate to the heaters "Off" value C, due to the fact that the heater 62 is at a much higher temperature than the maximum temperature attained by the toasted surface of the bread slice removed from the toaster. When the strip mid-portion 109 attains the temperature C at the point 5 along the time axis, it is immediately snapped to its open circuit setting to de-energize the heaters, with the result that both the heaters and the strip mid-portion 109 start to cool. In this case the time interval 5—6 is required to effect cooling of the strip mid-portion 109 to the heaters "On" temperature B. When this temperature of the strip mid-portion is attained, the strip is again snapped to its closed circuit position to start another operating cycle which in pattern is similar to that just described.

Assume now that at the instant 7 in the last described operating cycle, i. e. at a point shortly following movement of the thermostatic strip to its open circuit position, a second bread slice of the same type and condition as the first slice is inserted in the toaster. The surface of the second slice which faces the thermostatic element 78 is obviously at a temperature much lower than the temperature of the strip mid-portion 109. Accordingly, radiant energy is emitted from the strip mid-portion to the bread slice where it is absorbed, with the result that the strip mid-portion is cooled at an accelerated rate. Graphically, it is cooled to the temperature value D, well below the heaters "On" temperature B, in the short time increment 7—8 along the time axis. When the strip mid-portion attains the temperature B during cooling thereof, the strip is again snapped to its heaters "On" setting to re-energize the heating elements 62 and 63, thereby to initiate the toasting interval. Since, however, the bread surface temperature remains below that of the strip mid-portion 109 during the initial increment of the toasting interval, the temperature of the strip mid-portion continues to drop. From the point 8 along the time axis forward, the bread surface temperature starts to exceed the strip mid-portion temperature so that the direction of radiant energy transfer is reversed to produce an increase in the temperature of the strip mid-portion back to the heaters "Off" value C. This toasting interval is followed by a cooling interval which ends at the instant 9, at which point it may be assumed that the second bread slice is removed from the toaster. The temperature of the strip mid-portion 109 immediately starts to rise at a rapid exponential rate under the influence of direct radiant energy emission from the heating element 62.

Assume now that a third bread slice of the same type and condition as the first two slices is inserted in the toaster at the instant 10 along the time axis shortly after heating of the strip mid-portion is initiated. Here again, due to reverse radiant energy transfer from the strip mid-portion to the cool bread slice, the temperature of the strip mid-portion immediately starts to drop. This temperature drop continues until at the instant 11, the temperature of the bread slice surface is brought to a value at which reverse radiant energy transfer from the bread surface to the strip mid-portion occurs. From this instant forward the temperature of the strip mid-portion increases until the heaters "Off" value C is again attained at the instant 12.

From the above explanation it will be apparent that regardless of the point in an operating cycle of the toaster at which a new bread slice is inserted in the toaster, the toasting interval remains substantially constant, assuming that the operating conditions of the toaster do not change and further that bread of the same type and condition is being toasted. Thus the time intervals 1—2, 7—8a and 10—12 are substantially equal. This is due to the fact that the response of the thermostatic strip is predicated almost exclusively on the surface temperature of the bread slice being toasted and with minimum lag in response thereto.

Wherever reference is made to radiant energy emitted from the surface of the bread slice, only that radiant energy emanating from this surface by virtue of the temperature and radiation coefficient alone of said surface is referred to, to the exclusion of any radiant energy from any other temperature source, either direct, or reflected from said surface, or from any other surface. The radiant energy here defined is a function of both the bread surface temperature and the radiation coefficient of the surface being toasted. It has been found, moreover, that the radiation coefficient of the bread surface remains at a substantially constant high value throughout the entire range of surface temperatures during the toasting process and consequently the radiant energy emitted by the bread surface is primarily a function of its temperature alone.

As will be evident from the above explanation, the structure herein shown and described is such as to be free of substantially all of the objections heretofore associated with so-called automatic toasters, and likewise avoids the difficulties heretofore associated with such toasters, due to abnormal manipulation and use thereof. Thus, the degree of toasting of slices subsequent to the first of a series is not affected by premature removal of the prior slices of toast. During the toasting period the thermostat is shielded from the heating elements and receives its energy primarily from the bread surface, and therefore changes in the voltage applied to the device during the toasting interval have substantially no effect on the color of the toast, at least within the voltage ranges normally encountered. Furthermore, the thermostatic strip is responsive to the average temperature of the bread surface as distinguished from a relatively small area, and consequently the presence of holes or local variations in the color of the bread does not materially affect the operation. Moreover, differences in the initial color of the bread, as, for example, color differences between white bread, whole wheat and rye bread do not substantially affect the degree of toasting. Further, differences in the moisture content of different slices do not cause variations in the degree of toasting of the toasted slices.

In the commercial application of my invention it may be desired that the toasting elements remain de-energized at the end of the toasting operation and be subsequently energized only upon removal of the toasted slice and the insertion of a fresh bread slice. One type of such control is illustrated in my copending application Serial No. 436,649, filed March 28, 1942, for Toaster control mechanism.

While one embodiment of the invention has been described and illustrated, it will be understood that various modifications may be made therein which are within the true spirit and scope of the invention as defined in the appended claims.

I claim:

1. In a bread toaster or the like, in combination, heating means, means for holding a bread slice in toasting relation to said heating means, and control means for causing heat to be applied from said heating means to said slice for a toasting interval including radiation-sensitive means responsive in a control function to only that radiant energy emitted from the surface of the bread slice by virtue of the temperature of said surface while it is being toasted, means operated by said response to terminate the application of said heat when said radiation emission from the surface of the bread slice has increased to a predetermined value, said radiation-sensitive means comprising a relatively thin bimetallic strip, and means supporting the strip at its opposite ends with such ends restrained against angular and translational movement, shielding means providing an enclosure about the strip except for an opening which exposes to the described radiation emission the mid-portion of the strip and shields from said radiation emission the end portions of the strip, whereby said mid-portion of the strip is primarily responsive to the described radiation emission and the end portions of the strip are responsive to the ambient temperature and to the temperature of said end supporting means in a secondary or compensating action opposite from that of said primary response.

2. In a bread toaster or the like, in combination, heating means, means for holding a bread slice in toasting relation to said heating means, and control means for causing heat to be applied from said heating means to said slice for a toasting interval including radiation-sensitive means responsive in a control function to only that radiant energy emitted from the surface of the bread slice by virtue of the temperature of said surface while it is being toasted, means operated by said response to terminate the application of said heat when said radiation emission from the surface of the bread slice has increased to a predetermined value, said radiation-sensitive means comprising a relatively thin bimetallic strip widest at its mid-portion and narrowing toward each end, and means supporting the strip at its opposite ends with such ends restrained against angular and translational movement, shielding means providing an enclosure about the strip except for an opening which exposes to the described radiation emission the mid-portion of the strip and shields therefrom the end portions of the strip, whereby said mid-portion of the strip is primarily responsive to the described radiation emission and the end portions of the strip are responsive to the ambient temperature and to the temperature of said end supporting means in a secondary or compensating action opposite from that of said primary response.

3. The combination in a toaster or the like, of spaced heating elements for toasting a slice of bread disposed therebetween, a thermostat disposed at one side of said slice and in spaced relation thereto shielded from the heating element on the adjacent side of said slice and thermally responsive to radiation emitted by virtue of the temperature of the surface of said bread slice, means for supporting said slice between said elements so that the bread slice shields said thermostat from radiation from the heating element on the opposite side of said slice and to supply said radiation from a surface of said bread slice to said thermostat during a toasting interval, circuit control means actuated by said thermostat upon reaching a temperature corresponding to a preselected temperature of said surface to de-energize said heating elements, radiation from the last mentioned heating element to said thermostat serving to rapidly heat said thermostat and actuate said control means upon premature removal of said slice.

4. The combination in a toaster or the like, of means for holding a bread slice to be toasted, a heating element spaced from said slice for toasting a surface thereof, thermostat means comprising a bi-metallic strip, means for supporting said strip at the ends thereof to prevent angular temperature responsive movement of said ends to induce, under temperature change, forces in the strip tending to produce movement of a part of said strip in one direction in response to temperature changes of the surrounding parts, means for directing radiant energy emitted by virtue of the temperature of the surface of said slice against the central portion of said thermostat strip to induce forces in the strip tending to produce movement of said part in the opposite direction under temperature changes in the same sense, thereby to produce a net movement of the said part responsive to the temperature of the slice surface and substantially independent of the temperature of the surrounding elements, and means responsive to said net movement of said strip part for terminating a toasting interval.

5. The combination in a toaster or the like, of means for holding a bread slice to be toasted, a heating element spaced from said slice for toasting a surface thereof, thermostat means comprising a bi-metallic strip stressed longitudinally to move with a snap action between opposed heated and cooled positions, means for supporting said strip at the ends thereof to prevent angular movement of said ends, thereby to induce, under temperature change, forces in the strip tending to produce movement of a part of said strip in one direction in response to temperature changes of the surrounding parts, means for directing radiant energy emitted by virtue of the temperature of the surface of said slice against the central portion of said strip to induce forces in the strip tending to produce movement of said part in the opposite direction under temperature changes in the same sense, thereby to produce a net movement of said part responsive to the temperature of the slice surface and substantially independent of the temperature of surrounding parts of the toaster, means for limiting the amplitude of movement of said strip, thereby adjustably to preselect the temperature required to produce said snap movement, and means responsive to said snap movement of said strip part for terminating a toasting interval.

6. The combination in a toaster or the like, of means for holding a bread slice to be toasted, a heating element spaced from said slice for toasting a surface thereof, thermostat means comprising a bi-metallic strip, means for supporting said strip at the ends thereof to prevent angular temperature responsive movement of said ends, thereby to induce, under temperature change, forces in the strip tending to produce movement of a part of said strip in one direction in response to temperature changes of the surrounding parts, means for directing radiant energy emitted by virtue of the temperature of the surface of said slice against the central portion of said strip to induce forces in the strip tending to produce movement of said part in the opposite direction under temperature changes in the same sense, thereby to produce a net movement of the said part responsive to the temperature of the slice surface and substantially independent of the temperature of the surrounding elements, a surface coating on the central portion of said strip of a material having a high coefficient of absorption for infra-red radiation to render the central portion of said strip highly responsive to the temperature of said slice surface, and means responsive to said net movement of said strip part for terminating a toasting interval.

7. A toaster or the like having, in combination, means for supporting a bread slice, heating means for toasting said bread slice, a thermostat constructed and arranged with relation to said supported bread slice and said heating means to be primarily responsive to only that radiation emitted by a portion of the surface of said bread slice while it is being toasted, said radiation being that radiant energy emitted by virtue of the temperature of said surface, the thermostat having a coating of high absorption coefficient for infrared rays applied to a given portion only thereof to obtain maximum absorption of said radiation by said portion of the thermostat to thereby increase the net response of the thermostat to said radiation, whereby to produce more uniform toast in successive toasting operations, and means responsive to the net response of said thermostat for terminating a toasting interval.

8. The combination in a toaster or the like, of means for holding a bread slice to be toasted, a heating element spaced from said slice for toasting a surface thereof, thermostat means comprising a bi-metallic strip, means for supporting said strip at the ends thereof to restrain angular temperature responsive movement of said ends, thereby to induce, under temperature change, forces in the strip tending to produce movement of a part of said strip in one direction in response to temperature changes of the surrounding parts, means for directing radiant energy emitted by virtue of the temperature of the surface of said slice against the central portion of said strip to induce forces in the strip tending to produce movement of said part in the opposite direction under temperature changes in the same sense, thereby to produce a net movement of the said part responsive to the temperature of the slice surface and substantially independent of the temperature of the surrounding elements, the central portion of said strip having a surface coating having a high coefficient of absorption for infra-red radiation to render the central portion highly responsive to the temperature of said slice surface and the end portions of said strip having a bright reflective surface and a low coefficient of absorption for infra-red radiation to obtain minimum responsiveness of said end portions, and means responsive to said net movement of said strip part for terminating a toasting interval.

9. The combination in a toaster or the like, of means for holding a bread slice to be toasted, a heating element spaced from said slice for toasting a surface thereof, thermostat means comprising a bi-metallic strip, the width of said strip being greater in the central portion than near the ends thereof, means for supporting said strip at the ends to restrain angular temperature responsive movement of said ends to thereby induce in the strip, under temperature change, forces tending to move a part of said strip in one direction, said ends being supported in good conductive relation to surrounding parts of the toaster to cause said ends to be primarily temperature responsive to said parts, means for directing radiant energy emitted by virtue of the temperature of the surface of said slice against the central portion of the strip to induce forces in the strip tending to move said part in the opposite direction under temperature change, thereby to produce a net movement of said part responsive to the temperature of the slice surface and substantially independent of the temperature of the surrounding toaster elements, the width of the central portion and the ends of said strip being preselected in accordance with the proportions of heat normally supplied to said strip from the bread surface and the surrounding toaster parts, and means responsive to said net movement of said strip part for terminating a toasting interval.

10. The combination in a toaster or the like, of means for holding a bread slice to be toasted, a heating element spaced from said slice for toasting a surface thereof, thermostat means comprising a bi-metallic strip stressed longitudinally to move with a snap action between opposed heated and cooled positions, the width of said strip being greater in the central portion than near the ends thereof, means for supporting said strip at the ends to restrain angular temperature responsive movement of said ends to thereby induce in the strip, under temperature change, forces tending to move a part of said strip in one direction, said ends being supported in good conductive relation to surrounding parts of the toaster to cause said ends to be primarily temperature responsive to said parts, means for directing radiant energy emitted by virtue of the temperature of the surface of said slice against the central portion of the strip to induce forces in the strip tending to move said part in the opposite direction under temperature change, thereby to produce a net movement of said part responsive to the temperature of the slice surface and substantially independent of the temperature of the surrounding toaster elements, the width of the central portion and the ends of said strip being preselected in accordance with the proportions of heat normally supplied to said strip from the bread surface and the surrounding toaster parts, a surface coating on the central portion of said strip of a material having a high coefficient of absorption for infra-red radiation to render the central portion highly responsive to the temperature of said slice surface, the end portions of said strip having a bright reflective surface and a low coefficient of absorption for infra-red radiation to obtain minimum responsiveness of said end portions, and means responsive to said net movement of said strip part for terminating a toasting interval.

11. A bread toaster comprising bread slice holding means, bread slice heating means for heating a bread slice held by said holding means, thermostatic means spaced from the heated surface of the bread slice for intercepting radiant energy within the infra-red spectrum emitted from the heated surface of the bread slice, reflector means partially surrounding said thermostatic means and operative to focus the infra-red energy emitted from a substantial portion of the area of said heated surface onto at least a portion of said thermostatic means, said thermostatic means including an element operative from one setting to a different setting in response to predetermined infra-red energy emission from said heated surface, means for limiting the response of said thermostatic means substantially to that effected by said emitted energy, and means responsive to operation of said element from said one setting to said different setting for terminating a bread toasting interval.

12. A bread toaster comprising bread slice holding means, bread slice heating means for heating a bread slice held by said holding means, thermostatic means spaced from the heated surface of the bread slice for intercepting radiant energy within the infra-red spectrum emitted from the heated surface of the bread slice, reflector means partially surrounding said thermostatic means and operative to focus the infra-red energy emitted from a substantial portion of the area of said heated surface onto at least a portion of said thermostatic means, said thermostatic means including an element operative from one setting to a different setting in response to predetermined infra-red energy emission from said heated surface, means including said reflector means for preventing the response of said thermostatic means from being appreciably affected by environment energy other than said emitted energy, and means responsive to operation of said element from said one setting to said different setting for terminating a bread toasting interval.

13. A bread toaster comprising bread slice holding means, bread slice heating means for heating a bread slice held by said hold means, thermostatic means spaced from the heated surface of the bread slice for intercepting radiant energy within the infra-red spectrum emitted from the heated surface of the bread slice, means partially surrounding said thermostatic means and operative to focus the infra-red energy emitted from a large portion of the area of said heated surface onto at least a portion of said thermostatic means, said thermostatic means including an element operative from one setting to a different setting in response to predetermined infra-red energy emission from said heated surface, means for preventing the response of said thermostatic means from being appreciably affected by environment energy other than said emitted energy, means responsive to operation of said element from said one setting to said different setting for terminating a bread toasting interval, and means for adjustably cutting off the path of infra-red energy transfer from the heated surface of a bread slice to said thermostatic and reflector means, thereby adjustably to change the bread surface temperature at which said element is caused to operate from said one setting to said different setting.

14. A bread toaster comprising, bread slice holding means, heating means for heating at least one side of a slice of bread held by said holding means, a thermal responsive element spaced from said one side of the bread slice and responsive to radiant heat energy impinging thereon, a structure for shielding said element from said heating means and including means for directing upon said element the radiant heat energy emitted from at least a substantial surface portion of said one side of the bread slice, whereby said element is rendered responsive to the average temperature of said substantial surface portion of the bread slice, and a device controlled by said thermal responsive element to terminate a toasting interval in response to the attainment of a predetermined average surface temperature by said substantial surface portion of the bread slice.

15. A bread toaster comprising, bread slice holding means, heating means for heating at least one side of a slice of bread held by said holding means, a bi-metallic thermal responsive element spaced from said one side of the bread slice, means for focusing upon a given surface area of said thermal responsive element radiant heat energy emitted from a substantial surface area of said one side of the bread slice which is at least several times greater than said given surface area of said element, thereby to render said thermal responsive element responsive to the average temperature of said substantial surface portion of the bread slice, and a device controlled by said thermal responsive element to terminate a bread toasting interval in response to the attainment of a predetermined surface temperature by said substantial surface portion of the bread slice.

16. A bread toaster comprising, bread slice heating means, bread slice holding means for holding a bread slice in a position to receive heat from said heating means, means including a thermal responsive element spaced from the bread slice to intercept radiant heat energy emitted by a substantial heated surface area of the bread slice and responsive to predetermined radiant energy emission from said heated surface area to said thermal responsive element for terminating a bread toasting interval, and means for limiting the response of said last-named means substantially to that effected by said emitted radiant energy.

17. A toaster for toasting bread comprising, bread slice heating means, bread slice holding means for holding a bread slice in a position to receive heat from said heating means, a thermal responsive element spaced from the bread slice to intercept radiant heat energy emitted by a heated surface of the bread slice and operative from one setting to a different setting in response to predetermined radiant energy emission thereto from said heated surface, means for limiting the response of said thermal responsive element substantially to that effected by said emitted radiant energy, and a control device responsive to operation of said element from said one setting to said different setting for terminating a bread toasting interval.

18. A bread toaster comprising, bread slice heating means, bread slice holding means for holding a bread slice in a position to receive heat from said heating means, toasting interval control means including a thermal responsive element spaced from the bread slice to intercept radiant energy emitted by a substantial heated surface area of the bread slice and responsive to predetermined radiant energy emission from said heated surface to said thermal responsive element for terminating a bread toasting interval, a shielding structure for shielding said thermal responsive element from at least a part of said heating means, and response limiting means including said shielding structure for limiting the effective response of said toaster interval control means substantially to that effected by radiant energy emission from said heated surface to said thermal responsive element.

19. A bread toaster comprising, bread slice holding means, heating means for heating at least one side of a slice of bread held by said holding means, a bimetallic thermal responsive element spaced from said one side of the bread slice, a shielding structure for thermally shielding said element from at least a part of said heating means, energy directing means for focusing upon a given surface area of said element radiant energy emitted from a substantial surface area of said one side of the bread slice which is at least several times greater than said given surface area of said element, thereby to render said thermal responsive element responsive to the average temperature of said substantial surface portion of the bread slice, a device controlled by said thermal responsive element to terminate a bread toasting interval in response to the attainment of a predetermined average surface temperature by said substantial surface portion of the bread slice, and response limiting means for limiting the effective response of said element substantially to that effected by variations in the average temperature of said substantial surface portion of the bread.

20. A bread toaster comprising, spaced heating elements for toasting a slice of bread disposed therebetween, a bimetallic element spaced from one side of the element to respond to radiant energy emitted thereto from a substantial heated surface of the bread slice during a toasting interval, a shielding structure for thermally shielding said bimetallic element from the heating element disposed on said one side of the bread slice, bread slice holding means for so supporting the bread slice between said elements that the bread slice shields said bimetallic element from the other heating element on the opposite side of the bread slice and said substantial heated surface of the bread slice is positioned to supply radiant energy to said bimetallic element, a control device controlled by said bimetallic element to terminate a toasting interval in response to predetermined radiant energy emission from said substantial surface of the bread slice to said bimetallic element, response limiting means including said shielding structure for limiting the effective response of said bimetallic element substantially to that effected by radiant energy emission to said bimetallic element, and means supporting said bimetallic element to be directly exposed to radiant energy emission from said other heating element when a bread slice is removed from said bread slice holding means, thereby to accelerate the operation of said control device upon premature removal of a bread slice from said bread slice holding means.

LUDVIK J. KOCI.

REFERENCES CITED

The following references are of record in the file of this patent:

UNITED STATES PATENTS

| Number | Name | Date |
|---|---|---|
| 1,540,628 | Hurxthal et al. | June 2, 1925 |
| 2,110,748 | Tweedale | Mar. 8, 1938 |
| 2,162,098 | McCabe | June 13, 1939 |
| 2,179,422 | Myers et al. | Nov. 7, 1939 |
| 2,236,402 | Gomersall | Mar. 25, 1941 |
| 2,237,146 | Ireland | Apr. 1, 1941 |
| 2,254,946 | Ireland | Sept. 2, 1941 |
| 2,262,498 | Holm-Hansen | Nov. 11, 1941 |
| 2,271,485 | Koci | Jan. 27, 1942 |
| 2,275,265 | Mead | Mar. 3, 1942 |
| 2,303,561 | Koci | Dec. 1, 1942 |
| 2,332,518 | Koci | Oct. 26, 1943 |
| 2,390,947 | Koci | Dec. 11, 1945 |